US012583686B2

(12) United States Patent
Dupre et al.

(10) Patent No.: US 12,583,686 B2
(45) Date of Patent: Mar. 24, 2026

(54) ROLLER-AND-RAIL CARGO HANDLING SYSTEM WITH PALLET-MOVING TROLLEY

(71) Applicant: Textron Systems Corporation, Hunt Valley, MD (US)

(72) Inventors: Matthew Keith Dupre, Slidell, LA (US); Richard Earl Newman, III, Chalmette, LA (US); Glenn Michael Hauptmann, Diamondhead, MS (US); William Keith DuBose, Pensacola, FL (US)

(73) Assignee: Textron Systems Corporation, Hunt Valley, MD (US)

( * ) Notice: Subject to any disclaimer, the term of this patent is extended or adjusted under 35 U.S.C. 154(b) by 189 days.

(21) Appl. No.: 18/238,868

(22) Filed: Aug. 28, 2023

(65) Prior Publication Data

US 2024/0109730 A1      Apr. 4, 2024

Related U.S. Application Data

(60) Provisional application No. 63/411,799, filed on Sep. 30, 2022.

(51) Int. Cl.
B65G 35/06 (2006.01)
B65G 13/11 (2006.01)

(52) U.S. Cl.
CPC .............. B65G 35/06 (2013.01); B65G 13/11 (2013.01); *B65G 2201/0267* (2013.01)

(58) Field of Classification Search
None
See application file for complete search history.

(56) References Cited

U.S. PATENT DOCUMENTS

| | | | | |
|---|---|---|---|---|
| 5,076,515 | A | * | 12/1991 | Goon ........................ B64D 9/00 |
| | | | | 414/471 |
| 5,140,716 | A | * | 8/1992 | Rawdon ................... B64D 9/00 |
| | | | | 414/535 |
| 7,086,517 | B2 | | 8/2006 | Clos et al. |
| 7,344,013 | B2 | | 3/2008 | Krueger |
| 7,665,938 | B2 | | 2/2010 | Schulze |
| 7,731,460 | B2 | | 6/2010 | Brown et al. |
| 9,580,250 | B2 | | 2/2017 | Himmelmann |

(Continued)

FOREIGN PATENT DOCUMENTS

| | | |
|---|---|---|
| EP | 3650344 B1 | 5/2020 |
| GB | 874279 A | 8/1961 |
| WO | 2014049590 A1 | 4/2014 |

*Primary Examiner* — Kavel Singh
(74) *Attorney, Agent, or Firm* — BainwoodHuang

(57) ABSTRACT

A roller-and-rail cargo handling system that includes tracked rollers and side rails for receiving cargo pallets. A trolley system is used to move the pallets along the tracked rollers, which includes a trolley movable along a trolley track by one or more cables. The trolley includes (1) a body sized and configured for sliding beneath the pallet located on the tracked rollers, and (2) a pawl in a cavity of the body which is mounted for rotation between closed and open positions. In the open position the pawl extends above an upper surface of the body to engage a cutout of a pallet and exert a moving force thereto, and in the closed position the pawl is sufficiently within the cavity to permit the trolley to slide beneath the pallet without engagement thereof.

19 Claims, 3 Drawing Sheets

(56) References Cited

U.S. PATENT DOCUMENTS

| 10,086,943 | B2 * | 10/2018 | Schoen | B65G 39/025 |
| 10,202,065 | B2 | 2/2019 | Koehler | |
| 10,919,630 | B1 | 2/2021 | Lee et al. | |
| 11,345,475 | B2 | 5/2022 | Lee et al. | |
| 11,807,393 | B2 * | 11/2023 | Nuessen | B64C 1/20 |
| 2018/0194468 | A1 | 7/2018 | Brown et al. | |

* cited by examiner

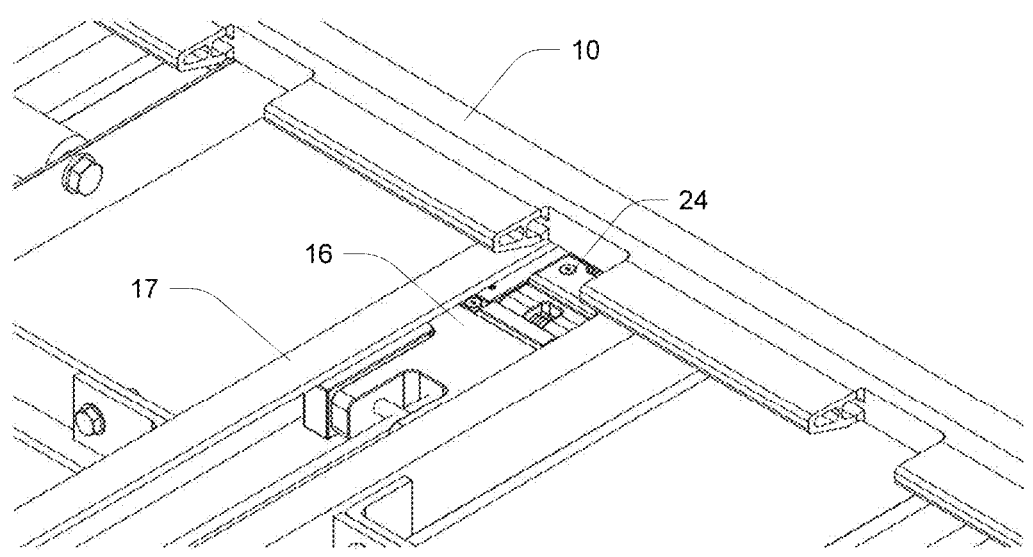
Fig. 3
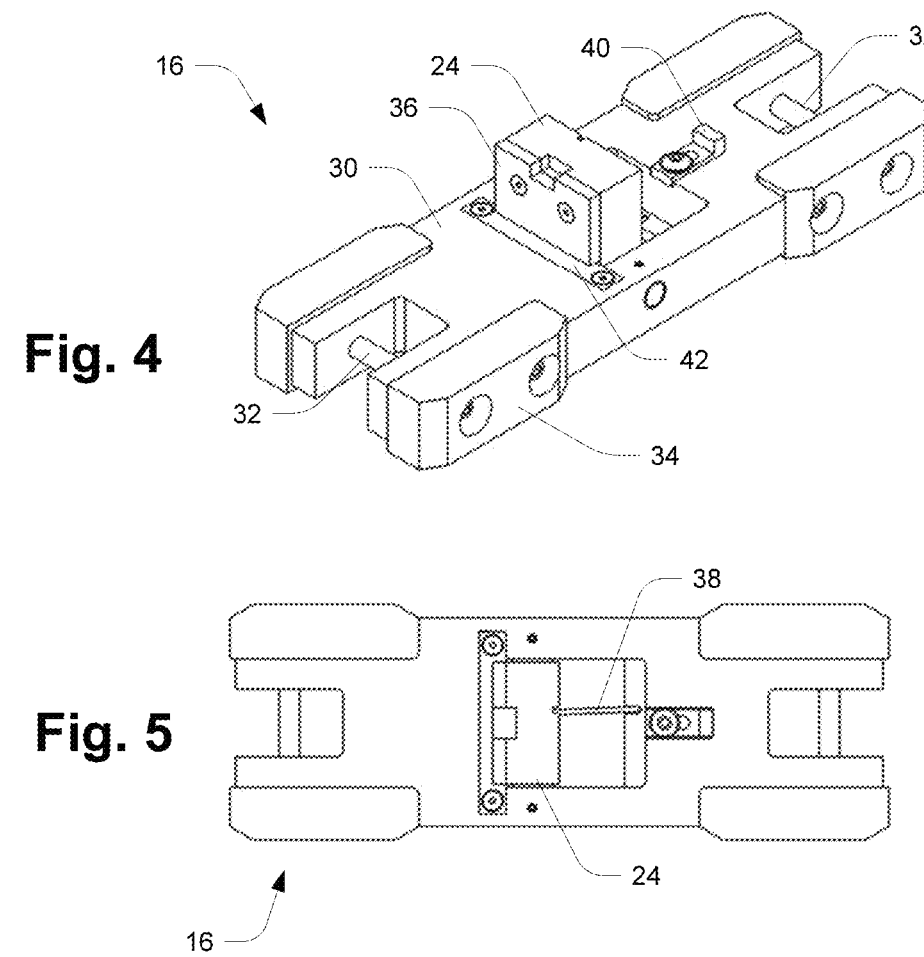
Fig. 4
Fig. 5

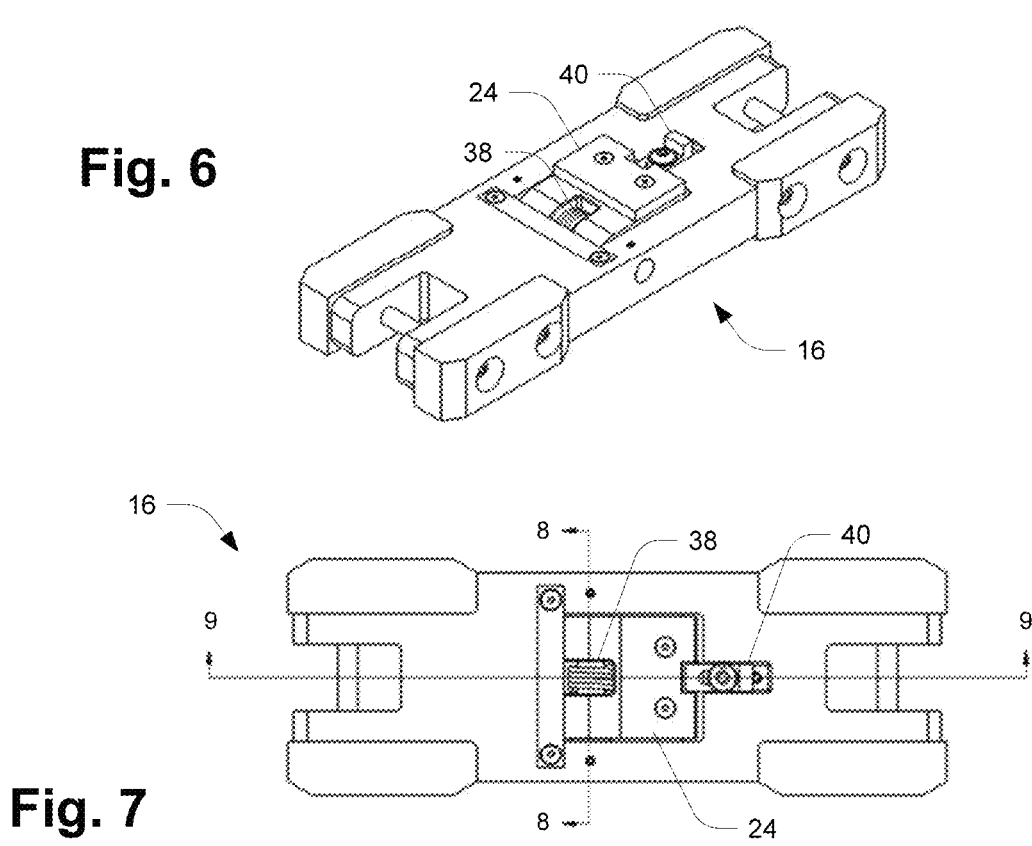
Fig. 6
Fig. 7
Fig. 8
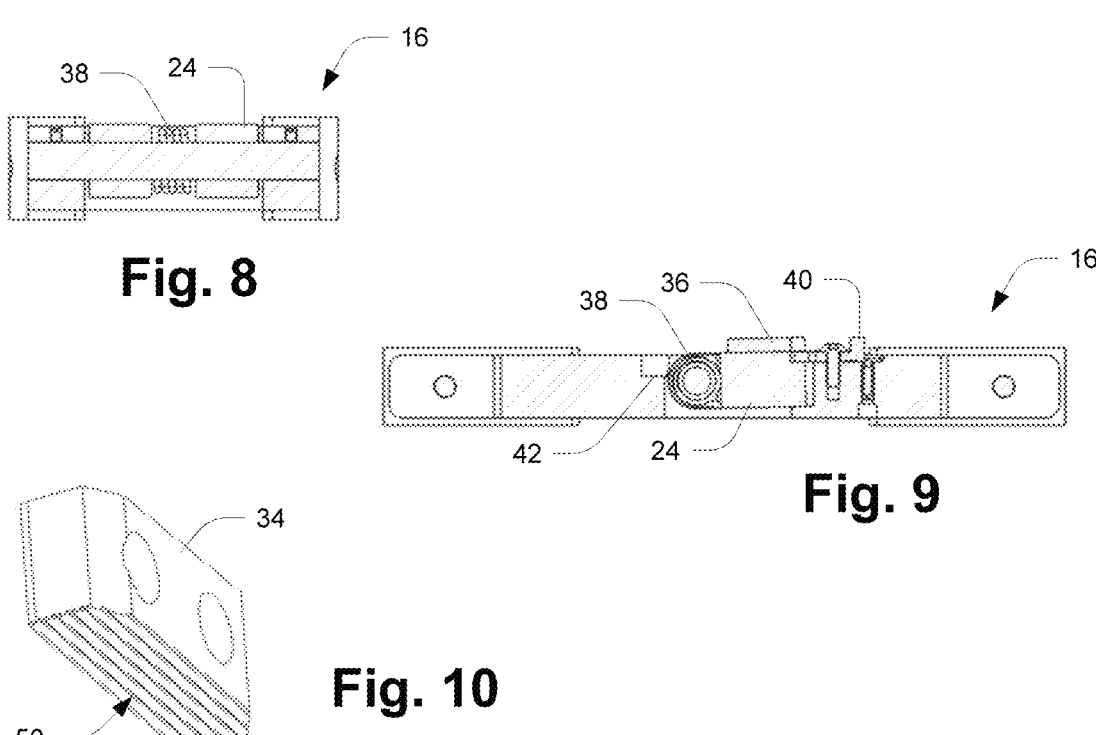
Fig. 9
Fig. 10

ROLLER-AND-RAIL CARGO HANDLING SYSTEM WITH PALLET-MOVING TROLLEY

BACKGROUND

The invention relates to the field of cargo handling using roller-and-rail cargo handling systems, including dual-rail cargo handling systems used on aircraft and ships.

SUMMARY

In one aspect, a trolley for moving a pallet in a roller-and-rail cargo handling system is disclosed. The trolley includes a body sized and configured for sliding beneath a pallet on a set of tracked rollers of the roller-and-rail cargo handling system. A pawl is disposed in a cavity of the body, the pawl being mounted for rotation between a closed position and an open position, the pawl in the open position extending above an upper surface of the body to engage a cutout of a pallet and exert a moving force thereto, the pawl in the closed position being sufficiently within the cavity to permit the trolley to slide beneath the pallet without engagement thereof.

In another aspect, a roller-and-rail cargo handling system is disclosed that includes a set of tracked rollers and side rails configured to receive a cargo pallet. The system also includes a trolley system for moving the cargo pallet along the tracked rollers, the trolley system including a trolley movable along a trolley track by one or more cables, the trolley including (1) a body sized and configured for sliding beneath the cargo pallet on the set of tracked rollers, and (2) a pawl disposed in a cavity of the body. The pawl is mounted for rotation between a closed position and an open position. In the open position the pawl extends above an upper surface of the body to engage a cutout of the cargo pallet and exert a moving force thereto, and in the closed position the pawl is sufficiently within the cavity to permit the trolley to slide beneath the pallet without engagement thereof.

Uses include rapid unloading of cargo pallets in a landing craft such as an air cushioned vehicle, as well as aircraft and dockside cargo handling applications.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 3 is an isometric view of a trolley in retracted configuration sliding beneath a pallet;

FIG. 4 is an isometric view of the trolley in extended configuration;

FIG. 5 is an orthographic top view of the trolley in the extended configuration of FIG. 4;

FIG. 6 is an isometric view of the trolley in retracted configuration;

FIG. 7 is an orthographic top view of the trolley in the retracted configuration of FIG. 6;

FIG. 8 is a section view along line 8-8 of FIG. 7;

FIG. 9 is a section view along line 9-9 of FIG. 7; and

FIG. 10 is an isometric view of an underside of a slide block.

DETAILED DESCRIPTION

Overview

Figures 1, 2:
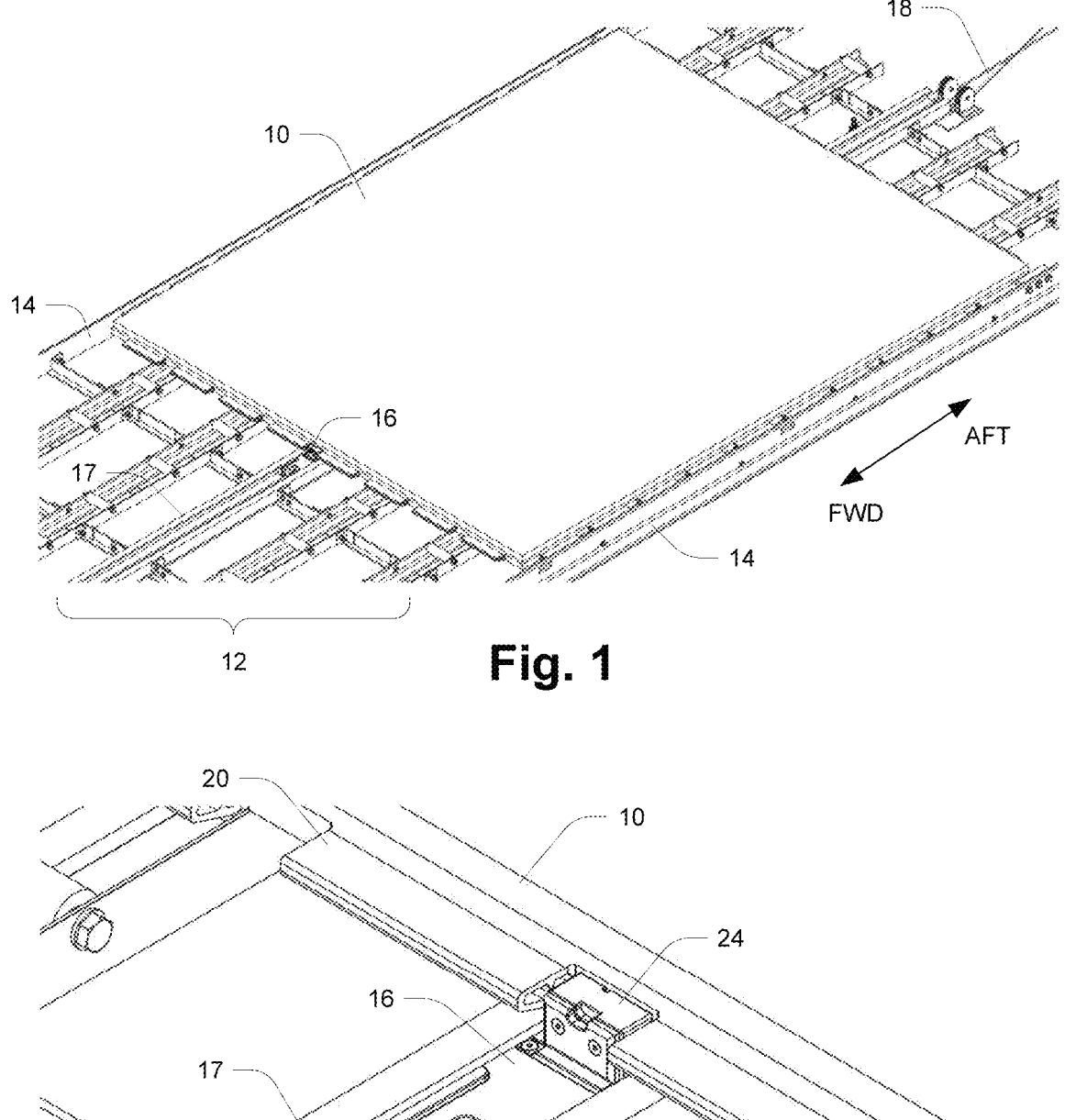
FIG. 1 is an isometric view of a roller-and-rail cargo handling system having a trolley for moving pallets.
FIG. 2 is an isometric view of a trolley in extended configuration engaging an edge of a pallet.

Traditionally, cargo roller systems are not powered and require human intervention to manually push the cargo pallets. In some cases, a winch is used to pull the cargo, but this winch would have to be manually connected to each pallet that needed to be pulled, creating risk of injury.

Other methods of unloading cargo include drogue parachutes in air drop operations or powered rollers in ground cargo handing operations.

A disclosed roller-and-rail cargo handling system employs a Positional Actuation Trolley having a pivoting pallet-engaging block that can be extended to engage a pallet and retracted or collapsed to permit the Trolley to be moved beneath a pallet. The Trolley is shuttled along a rail system by a wire cable or rope that is connected to a winch. The Positional Actuation Trolley allows the unloading of cargo pallets on command and in a controlled manner. The Positional Actuation Trolley also allows the sequential loading of cargo with reduced risk of injury to personnel, in contrast to conventional systems in which personnel push pallets by hand. The Positional Actuation Trolley system has the advantage of being low profile and being installed on a flat surface without major modification of existing vehicle framework.

The Positional Actuation Trolley rides in a track, either on bearings or a low friction material (e.g., PTFE) slide block. The track is mounted below the pallet so that the Positional Actuation Trolley can interface with the cargo pallet without obstruction. The Positional Actuation Trolley has a pawl feature to allow it to travel under the pallet and enable an operator to selectively offload pallets. In certain embodiments, the Positional Actuation Trolley utilizes a spring to extend the pawl and is used to push the cargo pallets in one direction (e.g., aft for offloading) and collapses under the cargo pallet for movement in the opposite (e.g., forward) direction. In another embodiment, the Positional Actuation Trolley is electrically actuated, and the pawl can be collapsed or extended on command.

In one application the Positional Actuation Trolley is used for unloading cargo pallets from a Ship to Shore Connector (SSC) landing craft used to deliver cargo to shore location that may lack cargo handling infrastructure (e.g., a tactical location). Traditionally, the unloading of an SSC requires the use of an all-terrain forklift. The trolley, as part of a multi-track cargo handling system (see US20220055847A1, for example), facilitates rapid unloading of cargo pallets from such a landing craft, resulting in greater operational flexibility and capability. Other water-borne applications include Landing Craft Air Cushion (LCAC) or other landing craft. The trolley may also be used in a variety of other cargo handling applications, including for example aircraft cargo handling and dockside cargo handling.

Embodiments

FIG. 1 shows a roller-and-rail cargo handling system in which a pallet 10 slides on track-arranged rollers 12 between a pair of retaining rails 14. In typical use the pallet 10 is a platform for a load of cargo, as generally known in the art, and the system is part of a vehicle (e.g., aircraft or SSC as described above) or a fixed facility (e.g., dockside). The system includes a trolley subsystem for automated movement of the pallets 10 on the rollers 12. The trolley subsystem includes a device referred to as a "trolley" 16 that is moved along a central track 17 by wire rope(s) or cable(s) 18 at one or both ends. In one application, the trolley subsystem is arranged to provide for fast offloading of pallets 10 from an aft end of a vehicle.

FIG. 2 shows details of the trolley 16 and its manner of engaging with pallet 10. The pallet 10 has an edge area 20 with cutouts 22, conventionally configured to engage with pallet locks for locking pallets into place. The trolley 16 has a member 24, also referred to as a "pawl" herein, that fits into a cutout 22 and imparts a pushing force, toward the upper right in this depiction. A remaining part of the trolley 16 sits within the track 17 that extends the length of the system parallel to the tracks for the rollers 12 (FIG. 1).

FIG. 2 shows the trolley 16 in an extended configuration in which the pawl 24 extends upwardly to engage the pallet 10 as shown.

FIG. 3 is a similar view but showing the trolley 16 in a retracted configuration in which the pawl 24 is rotated downward and secured by a sliding catch, as described more below. The pawl 24 occupies a cavity of the trolley 16 where it makes no contact with a pallet 10, enabling the trolley 16 to be moved beneath a pallet 10 as part of operation. In another embodiment, the pawl 24 is not secured by a catch. In this case, part of the pawl 24 contacts the pallet 10 and the pawl 24 is rotated downward by action of the trolley 16 passing under the pallet 10 in the forward direction. This mode of operation allows the trolley 16 to travel in the forward direction uninhibited, while still retaining the ability to move the pallet 10 in the aft direction.

FIGS. 4 and 5 show details of the trolley 16 in the extended configuration. The trolley 16 has a solid body 30 of a strong material (e.g., metal alloy). At either end it includes cross members 32 in respective notches for receiving end-loops of the cables 18 used to pull the trolley 16 along its track. At each corner it includes a slide block 34 preferably of a low-friction material such as PTFE. The pawl 24 has a body of strong material as well as a separate replaceable wear strip 36, and it is mounted for rotation at one end (toward the left in these views). A replaceable bearing surface 42 is made of a similar material to the pawl 24, which prevents the pawl 24 from damaging the solid body 30 of the trolley. The trolley 16 also includes a torsion spring 38 that biases the pawl 24 into the open or extended position, and a sliding catch 40 used to retain the pawl 24 in the closed or retracted position, as shown more specifically below. Alternatively, a catch may not be employed, as described above, in which case the wear strip 36 contacts the underside of the pallet and the movement of the trolley 10 beneath the pallet causes the pawl 24 to be rotated downward.

FIGS. 6 and 7 show the trolley 16 in the retracted configuration, retained by the catch 40 against the force of the torsion spring 38.

FIGS. 8 and 9 are section views along lines 8-8 and 9-9 respectively of FIG. 7, showing details of the torsion spring 36 and sliding catch 40.

FIG. 10 illustrates that the downward-facing surfaces of the slide blocks 34 are preferably formed with grooves or channels 50 to provide smoother sliding operation even in the presence of dirt or other debris in the track 17.

Manner of Operation

In one manner of operation, a pallet 10 is loaded onto the forward end of the track arranged rollers 12 utilizing a forklift or other means of cargo loading equipment. The pallet 10 is then pushed in the aft direction until the pawl 24 of the trolley 16 is on the forward end of the pallet 10. During the aft movement of the pallet 10, the pawl 24 may collapse under the pallet 10 by allowing the pallet 10 to compress the torsion spring 38 or by manually engaging the sliding catch 40. Once the pawl 24 is slightly beyond the forward end of the pallet 10, the trolley 16 can be moved in the aft direction by means of wire rope 18. This in turn pushes the pallet 10 in the aft direction due to the pawl 24 engaging with the cutout 22. If the pawl 24 is indexed between multiple pallets 10 and must be moved to a different location, a user may pull the trolley 16 forward, allowing the pawl 24 to collapse under the pallets. If the pawl 24 must be moved in the aft direction, but without moving any pallets 10, then the pawl must be manually collapsed, and the sliding catch 40 is engaged. Once the pawl 24 is in the correct position, the sliding catch 40 is manually disengaged. This operation allows forward loaded pallets 10 to be moved in the aft direction on track arranged rollers 12, eventually reaching the aft end of the track arranged rollers 12.

As noted above, the trolley system may also be used to effect rapid offloading of pallets previously loaded onto the roller-and-rail cargo handling system. The trolley 16 is positioned slightly forward of a pallet to be offloaded, then moved rearward with the pawl 24 in the open position to engage the pallet and apply a rearward force, causing the pallet to slide rearward. Any lock for the pallet will have been disengaged, and the pallet then slides rearward and off of a ramp or other transition feature of a vehicle into the water, air, or ground. In some embodiments it may be possible to offload multiple pallets at a time, with the trolley applying the offloading force to a forward-most pallet and the force being transmitted rearwardly among a line of pallets being offloaded.

In other embodiments, the trolley 16 may employ a servo actuated pawl 24, using a small servo motor for this purpose. In this arrangement, the pawl 24 could push a pallet 10 either forward or aft, and collapse under a pallet 10 without any manual interaction with the pawl 24.

While the embodiment of FIGS. 2-7 utilizes a mechanical spring force for rotating the pawl between closed and open positions, in other embodiments an alternative actuation mechanism may be used. For example, the trolley may employ a small electrically actuated servo motor for this purpose.

While various embodiments of the invention have been particularly shown and described, it will be understood by those skilled in the art that various changes in form and details may be made therein without departing from the scope of the invention as defined by the appended claims.

What is claimed is:

1. A trolley for moving a pallet in a roller-and-rail cargo handling system, comprising:

a body sized and configured for sliding beneath a pallet on a set of tracked rollers of the roller-and-rail cargo handling system; and a pawl disposed in a cavity of the body, the pawl being mounted for rotation between a closed position and an open position, the pawl in the open position extending above an upper surface of the body to engage a cutout of a pallet and exert a moving force thereto, the pawl in the closed position being sufficiently within the cavity to permit the trolley to slide beneath the pallet without engagement thereof; and a torsion spring configured to bias the pawl into the open position, such that the pawl is retained in the closed position by a separate mechanism opposing the torsion spring;

wherein the separate mechanism is contact between the pawl and an underside of the pallet, such that movement of the trolley beneath the pallet causes the pawl to be rotated downward.

2. The trolley of claim 1, wherein the body includes one or more cross members configured for receiving respective loops of cable used to effect the sliding movement of the trolley during operation.

3. The trolley of claim 2, wherein the cross members are disposed in respective notches at opposite ends of the trolley.

4. The trolley of claim 1, further including slide blocks affixed to the body and made of a lower-friction material arranged to contact a track of the roller-and-rail cargo handling system in which the trolley slides during operation.

5. The trolley of claim 1, further including bearings on which the trolley rides in a track of the roller-and-rail cargo handling system.

6. The trolley of claim 1, wherein the pawl includes a replaceable wear strip configured to contact a protective bearing surface of the body when the pawl is in the open position, the wear strip located away from a point of contact of the pawl with the cutout of the pallet.

7. The trolley of claim 1, wherein the separate mechanism includes a sliding catch affixed to the body of the trolley.

8. The trolley of claim 1, further including a servo motor configured and operative to provide servo actuation to the pawl between the open and closed positions.

9. The trolley of claim 1, wherein the roller-and-rail cargo handling system has a forward end and a rearward end opposite the forward end; and wherein the body of the trolley is configured to slide from the forward end toward the rearward end in an unloading operation in which the pawl in the open position exerts the moving force to move the pallet on the set of tracked rollers toward the rearward end, the pawl disengaging the cutout of the pallet while the pallet continues to move responsive to the moving force, the pallet moving off of the roller-and-rail cargo handling system at the rearward end.

10. A roller-and-rail cargo handling system, comprising:
a set of tracked rollers and side rails configured to receive a cargo pallet; and
a trolley system for moving the cargo pallet along the tracked rollers, the trolley system including a trolley movable along a trolley track by one or more cables, the trolley including:
  (1) a body sized and configured for sliding beneath the cargo pallet on the set of tracked rollers,
  (2) a pawl disposed in a cavity of the body, the pawl being mounted for rotation between a closed position and an open position, the pawl in the open position extending above an upper surface of the body to engage a cutout of the cargo pallet and exert a moving force thereto, the pawl in the closed position being sufficiently within the cavity to permit the trolley to slide beneath the pallet without engagement thereof, and
  (3) a torsion spring configured to bias the pawl into the open position, such that the pawl is retained in the closed position by a separate mechanism opposing the torsion spring;

wherein the separate mechanism is contact between the pawl and an underside of the pallet, such that movement of the trolley beneath the pallet causes the pawl to be rotated downward.

11. The roller-and-rail cargo handling system of claim 10, further including a track in which the trolley is disposed and slides during operation.

12. The roller-and-rail cargo handling system of claim 11, wherein the track is located centrally between respective sub-sets of the set of tracked rollers and side rails.

13. The roller-and-rail cargo handling system of claim 10, further including one or more cables affixed to the body of the trolley for effecting the sliding movement during operation.

14. The roller-and-rail cargo handling system of claim 13, wherein the body includes one or more cross members configured for receiving respective loops of the one or more cables.

15. The roller-and-rail cargo handling system of claim 14, wherein the cross members are disposed in respective notches at opposite ends of the trolley to receive respective cables.

16. A method of moving a pallet of cargo in a roller-and-rail cargo handling system, comprising:
bringing a trolley of the roller-and-rail cargo handling system to a position forward of the pallet, the trolley including a pawl mounted for rotation between a closed position and an open position, the pawl in the closed position enabling the trolley to be moved beneath the pallet to the forward position, the pawl transitioning to the open position when the trolley is in the forward position to extend upwardly and engage a cutout of a pallet to exert a moving force thereto; and
subsequently moving the trolley to first bring the pawl into contact with the cutout of the pallet and then to push the pallet in the aft direction by force exerted by the pawl of the trolley,
wherein the trolley further includes a torsion spring configured to bias the pawl into the open position, such that the pawl is retained in the closed position by a separate mechanism opposing the torsion spring, and
wherein the separate mechanism is contact between the pawl and an underside of the pallet, such that movement of the trolley beneath the pallet causes the pawl to be rotated downward.

17. The method of claim 16, performed as part of an operation of loading the pallet onto the roller-and-rail system, the operation including a preceding step of first placing the pallet onto a forward end of the roller-and-rail system in a manner enabling the trolley moving of claim 16 to then be performed.

18. The method of claim 16, performed as part of an operation of offloading the pallet from the roller-and-rail system, the operation including a step of unlocking the pallet from the roller-and-rail system to enable the pallet to be offloaded in response to the force exerted by the pawl of the trolley.

19. The method of claim 16, wherein bringing the trolley to the forward position and moving the trolley includes use of respective cables connected to respective ends of the trolley to pull the trolley in the forward and aft directions respectively.

* * * * *